UNITED STATES PATENT OFFICE 2,355,977

SEALING COMPOSITION

Hugh E. Hughes, Berkeley, Calif.

No Drawing. Application June 3, 1942,
Serial No. 445,650

3 Claims. (Cl. 106—33)

This invention relates to a composition of matter, and especially to one that is capable of stopping leaks in rubber, such as in pneumatic rubber tires.

It is one of the objects of this invention to provide a sealing compound that utilizes inexpensive ingredients, and yet is capable of completely sealing a leak when inserted in the interior of a tire.

For this purpose, use is made of several definite types of ingredients that cooperate effectively to produce the sealing function, as for example, by utilizing a material that serves as a relatively coarse filler, and another ingredient that serves effectively to fill the interstices between the filler particles. A continuous sealing layer is also provided by the aid of the composition, for entirely covering these other ingredients.

Accordingly, it is another object of this invention to provide a substantially dry composition that, when mixed with water or other carrier liquid, may be placed within a tire and will perform the function of stopping and sealing the punctures.

This invention has other objects and advantages, which will become apparent as the description proceeds. Although the description is confined to a few forms of the invention, the invention is not to be limited thereto, since the scope of the invention may be best defined by the aid of the appended claims.

The ingredients used in the composition are intimately mixed as by tumbling, and the resultant granular mixture may be mixed with water and then poured into the tire through the valve stem, after the valve core is removed. Inflation and subsequent rotation of the tire in service will cause appropriate adherence of the composition to the tire surface.

Important ingredients include a material capable of being received in the puncture and serve as a porous stopper. Ground wood is an acceptable material for this, the mesh size being from 16 to 20 mesh, and having finer grains as fine as 200 mesh. Other material could be substituted, so long as this general function is accomplished and without any deleterious effect upon the other ingredients. Such substitutes may be rubber dust, mica flakes, ground cork, or bran.

Another important ingredient is a filler, capable of filling the interstices between the coarser ground wood particles, and rendering the filled space where the puncture occurs, less porous. Such an ingredient is fuller's earth; but other minerals may be substituted, in finely ground form, such as yellow or white clay, whiting, or decomposed serpentine.

Still another ingredient is one that forms a colloid, closely contacting the other ingredients and sealing the interstices. Examples of such colloid forming ingredients are bentonite and soap root.

Another ingredient, such as asbestos floats, furnishes a mass of minute fibrous material that helps hold the ingredients in suspension.

It is also advisable to ensure that, upon the addition of water just prior to the use of the composition, the viscosity of the mixture can be kept fairly high. This added viscosity ensures against too rapid motion of the mixture during the operation of the tire after the mixture has been placed therein. An example of this ingredient is glucose or glycerine.

The process of forming the composition may now be detailed. There are two separate mixtures, independently prepared, which are later combined to form the base of the completed composition.

The first mixture is composed of fifteen pounds of 18 mesh ground wood, and five ounces of lamp black. These proportions are not critical; the wood can be as little as ten pounds and as much as twenty pounds. The lamp black can be as little as four ounces, and as much as eight ounces. This first mixture is tumbled for thorough intermingling, preferably for about 45 minutes. After tumbling, there is added five pints of glucose syrup composed of 60% glucose and 40% water. The mixture is then again tumbled or agitated for another 45 minutes. After this second tumbling operation, there are added to the mixture twenty-five pounds of fuller's earth and one ounce of lamp black. After a third tumbling for an hour, this first mixture is complete. This first mixture is in the form of a dry powder. The quantity of fuller's earth should not vary by more than 2% from the amount given above.

The lamp black in these mixtures serves mainly as a coloring matter; in addition it acts as a binder.

The second mixture is also a dry powder. It includes five pounds of fuller's earth; seven and a half pounds of bentonite; and seven and a half pounds of asbestos floats. The asbestos is in the form of minute fibres capable of holding the other ingredients together. The quantity of fuller's earth may vary by 2%; but the colloidal material should be kept within even narrower limits. After tumbling this dry mixture for about thirty minutes, it is sifted through an 18 mesh screen.

Now the first and second mixtures are combined and tumbled for about one-half hour. To the combination is now added four pints of glucose syrup of same type as used in the first mixture; it is also advisable to add a disinfectant or sterilizer to prevent fermentation; for example, a few ounces of any chlorine containing disinfectant can be used. Then the mixture is tumbled for forty-five minutes, and it is then dry enough to screen or sift. For automobile tire sizes, the sifting may be through 16 mesh; for small tires as for bicycles, the sifting may be through 18 mesh. The mixture is now ready for use.

The process of compounding of the composition is quite important. A very thorough agitation is required to ensure against lumping, or floating or sinking. When mixed as described, the ingredients can be kept in suspension when the compound is wetted for use in a tire.

This wet mixture may be placed into the tire, that is preferably mounted on the wheel. Rotation of the tire serves to segregate the coarser and finer particles; the coarser ones being urged outwardly against the inner tire surface. All of the particles are formed of ground wood or rubber soaked in glucose, to which adhere the much finer powdered bentonite and fuller's earth. The fuller's earth is an inert mineral in this composition. The glucose thus acts as a binder, supplementing the function of the lamp black. When water is added prior to use, the bentonite absorbs the water and the particles with the adherent matter floats in the water, and not in it. When the particle reaches a puncture cavity, it is urged therein. As it sinks into the puncture, colloids of much finer subdivision are loosened from the particle, and clog any minor leakage around the main particle or granule.

What is claimed is:

1. A sealing composition made up of the following ingredients: ten to twenty pounds of ground wood; approximately thirty pounds of fuller's earth; approximately seven and one-half pounds each of bentonite and asbestos floats; and approximately nine pints of a glucose and water mixture in which there is about 60% glucose.

2. A sealing composition made up of the following ingredients: ten to twenty pounds of ground wood; approximately thirty pounds of fuller's earth; approximately seven and one-half pounds each of bentonite and asbestos floats; and four to eight ounces of lamp black.

3. A sealing composition made up of the following ingredients: ten to twenty pounds of ground wood; approximately thirty pounds of fuller's earth; approximately seven and one-half pounds each of bentonite and asbestos floats; four to eight ounces of lamp black, and approximately nine pints of a glucose and water mixture in which there is about 60% glucose.

HUGH E. HUGHES.